United States Patent
Lu et al.

(10) Patent No.: US 8,938,554 B2
(45) Date of Patent: Jan. 20, 2015

(54) MECHANISM FOR ENABLING A NETWORK ADDRESS TO BE SHARED BY MULTIPLE LABELED CONTAINERS

(75) Inventors: Jarrett J. Lu, San Jose, CA (US); James D. Carlson, North Andover, MA (US); Glenn T. Faden, San Rafael, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1053 days.

(21) Appl. No.: 11/367,875

(22) Filed: Mar. 2, 2006

(65) Prior Publication Data

US 2007/0208873 A1    Sep. 6, 2007

(51) Int. Cl.
*G06F 15/173* (2006.01)
*H04L 29/08* (2006.01)

(52) U.S. Cl.
CPC .................................... *H04L 69/32* (2013.01)
USPC ........................................................ 709/238

(58) Field of Classification Search
CPC ................... H04N 19/00854; H04N 19/0086; G06F 3/0644; G06F 9/46; G06F 9/5077; G06F 11/0712; G06F 11/301; G06F 2212/152
USPC ........................................................ 709/238
See application file for complete search history.

(56) References Cited

U.S. PATENT DOCUMENTS

| | | | |
|---|---|---|---|
| 5,325,526 A | | 6/1994 | Cameron et al. |
| 5,437,032 A | | 7/1995 | Wolf et al. |
| 5,590,314 A | | 12/1996 | Ueno et al. |
| 5,784,706 A | | 7/1998 | Oberlin et al. |
| 5,841,869 A | | 11/1998 | Merkling et al. |
| 5,845,116 A | | 12/1998 | Saito et al. |
| 5,936,624 A | * | 8/1999 | Lisle et al. ..................... 715/835 |
| 5,963,911 A | | 10/1999 | Walker et al. |
| 6,032,217 A | * | 2/2000 | Arnott ........................... 710/200 |
| 6,064,811 A | | 5/2000 | Spilo et al. |

(Continued)

FOREIGN PATENT DOCUMENTS

| | | |
|---|---|---|
| EP | 1043658 A1 | 10/2000 |
| EP | 1 253 516 A2 | 10/2002 |

(Continued)

OTHER PUBLICATIONS

Mc Dougall, Richard, et al., "Resource Management", Prentice Hall, 1999, 25 pages.
Poul-Henning Kamp et al. "Jails: Confining SANE 2000", May 22-25, 2000.
Comm from the ACM ISNN 0001 to 0782 vol. 44 Issue 2, 2001 entitled "Operating System Approach Dalton, Choo" ACM Copyright 2001.

(Continued)

*Primary Examiner* — Azizul Choudhury
*Assistant Examiner* — Tariq Najee-Ullah
(74) *Attorney, Agent, or Firm* — Osha Liang LLP

(57) ABSTRACT

A mechanism is disclosed for enabling a network address to be shared by multiple containers. By allowing multiple containers to share a network address, a limit on network addresses does not limit the number of containers that can be implemented. Despite the fact that the network address is shared by multiple containers, the uniqueness and isolation of each container is still maintained. In one implementation, this is achieved by associating a unique label with each container. With this unique label, it is possible to forward a packet destined for the shared network address to a specific container despite the fact that multiple containers share the same network address. Thus, with this mechanism, it is possible to achieve container isolation and uniqueness without limiting container scalability.

12 Claims, 5 Drawing Sheets

(56) References Cited

U.S. PATENT DOCUMENTS

| | | | |
|---|---|---|---|
| 6,074,427 A | | 6/2000 | Fought et al. |
| 6,075,938 A | | 6/2000 | Bugnion et al. |
| 6,081,900 A | * | 6/2000 | Subramaniam et al. ........ 726/19 |
| 6,279,046 B1 | | 8/2001 | Armstrong et al. |
| 6,289,462 B1 | * | 9/2001 | McNabb et al. ................ 726/21 |
| 6,425,053 B1 | * | 7/2002 | Considine et al. ............ 711/114 |
| 6,438,594 B1 | | 8/2002 | Bowman-Amuah |
| 6,557,168 B1 | | 4/2003 | Czajkowski |
| 6,633,963 B1 | | 10/2003 | Ellison et al. |
| 6,681,238 B1 | | 1/2004 | Brice et al. |
| 6,681,258 B1 | | 1/2004 | Ratcliff et al. |
| 6,701,460 B1 | | 3/2004 | Suwandi et al. |
| 6,725,457 B1 | | 4/2004 | Priem et al. |
| 6,792,514 B2 | | 9/2004 | Kapoor et al. |
| 6,859,926 B1 | | 2/2005 | Brenner et al. |
| 6,944,699 B1 | | 9/2005 | Bugnion et al. |
| 6,957,435 B2 | | 10/2005 | Armstrong et al. |
| 6,993,762 B1 | | 1/2006 | Pierre |
| 7,051,340 B2 | | 5/2006 | Fisher et al. |
| 7,076,634 B2 | | 7/2006 | Lambeth et al. |
| 7,095,738 B1 | * | 8/2006 | Desanti .......................... 370/389 |
| 7,096,469 B1 | * | 8/2006 | Kubala et al. ................. 718/100 |
| 7,467,227 B1 | * | 12/2008 | Nguyen et al. ................ 709/239 |
| 7,561,571 B1 | * | 7/2009 | Lovett et al. .................. 370/392 |
| 7,664,110 B1 | * | 2/2010 | Lovett et al. .................. 370/392 |
| 7,685,281 B1 | * | 3/2010 | Saraiya et al. ................. 709/226 |
| 7,734,844 B2 | * | 6/2010 | Pedersen et al. ................. 710/36 |
| 7,843,907 B1 | * | 11/2010 | Abou-Emara et al. ........ 370/386 |
| 8,223,745 B2 | * | 7/2012 | Johnsen et al. ............... 370/351 |
| 2002/0083367 A1 | | 6/2002 | McBride et al. |
| 2002/0120660 A1 | | 8/2002 | Hay et al. |
| 2002/0124072 A1 | | 9/2002 | Tormasov et al. |
| 2002/0126642 A1 | * | 9/2002 | Shitama ........................ 370/338 |
| 2002/0156824 A1 | | 10/2002 | Armstrong et al. |
| 2002/0173984 A1 | | 11/2002 | Robertson et al. |
| 2002/0174215 A1 | | 11/2002 | Schaefer |
| 2003/0014466 A1 | | 1/2003 | Berger et al. |
| 2003/0037061 A1 | * | 2/2003 | Sastri et al. ................ 707/103 R |
| 2003/0069939 A1 | * | 4/2003 | Russell .......................... 709/214 |
| 2004/0010624 A1 | * | 1/2004 | Garofalo et al. .............. 709/250 |
| 2004/0162914 A1 | | 8/2004 | St. Pierre et al. |
| 2004/0210760 A1 | * | 10/2004 | McGrath et al. .............. 713/190 |
| 2004/0215848 A1 | | 10/2004 | Craddock et al. |
| 2005/0154841 A1 | * | 7/2005 | Sastri et al. ...................... 710/30 |
| 2006/0221975 A1 | * | 10/2006 | Lo et al. ...................... 370/395.5 |
| 2009/0080437 A1 | * | 3/2009 | Nguyen et al. ............ 370/395.31 |

FOREIGN PATENT DOCUMENTS

| | | |
|---|---|---|
| EP | 1282038 A2 | 2/2003 |
| EP | 1300766 A2 | 4/2003 |
| GB | 2301912 A | 12/1996 |
| WO | WO 00/45262 A2 | 8/2000 |

OTHER PUBLICATIONS

Sun Microsystems "Server 8 Operating Environment", Glenn Faden, Online, Feb. 2002.
Network Working Group entitled "IP Vers. 6 Addressing Architecture" by R. Hiden, Nokia Deering, Cisco dtd Jul. 1998.
IBM entitled "Partitioning for the IBM eserver pSeries 690 System", Copyright IBM 2001.
IBM System Partitioning on IBM eserver xSeries Servers and entitled "Effective Server Conso. Reserve Mgmt w/ IBM System" by Mark Chapman, dtd Dec. 2001.
Virtual Private Servers and Security Contexts dtd May 10, 2004.
SunSoft, a Sun Microsystems Inc Business entitled "File System Administration" 1994 Sun Microsystems.
European Patent Office, "European Search Report" from the for Foreign Patent Application No. 04252690.5, Aug. 31, 2004, (3 pgs.).
Claims As Filed in European Patent Application No. 04252690.5, (6 pgs.).
Overview of Bandwidth Broker System [online], [retrieved on Jan. 31, 2005]. Retrieved from the internet: <URL: http://www.ittc.ku.edu/~kdrao/845/into.html>, (19 pgs).
Qbone Signaling Design Team Final Report [online], [retrieved on Jan. 31, 2005]. Retrieved from the internet: <URL: http://qos.internet2.edu/wg/documents-informational/20020709-chimento-etal-qbone-signaling.>, (33 pgs).
Sun Microsystems, "Sun EnterpriseTM 1000 Server: Dynamic System Domains," White Paper Online, Feb. 26, 2003, retrieved from the internet at <http://www.sun.com/servers/highend/whitepapers/domains.html?facet=-1>, retrieved on Jun. 21, 2005, XP-002332946, 7 pages.
Vance, Ashlee, "Solaris 10 to get Zoned," The Register, Apr. 9, 2003, XP007901426, located on the internet at http://www.theregister.co.uk/2003/04/09/solaris, retrieved on Dec. 7, 2006, 2 pages.
European Patent Office, "European Search Report," App. No. 04252688.9, dated Dec. 21, 2006, 4 pages.
Current Claims, App. No. 04252688.9, 5 pages.
State Intellectual Property Office of P.R.C, "Second Office Action," application No. 200410063136.3, mailing date Jun. 1, 2007, 4 pages.
Current Claims, Foreign patent application 200410063136.3, 10 pages.
"CHMOD—Change the Permission Mode of a File," Internet Citation, Dec. 4, 2000, XP007901399, Retrieved from the internet at: http://www.cse.msu.edu/cgi-bin/man2html?chmod?1?/usr/man, retrieved in Dec. 4, 2006, 7 pages.
"SETFACL—Modify the Access Control List (ACL) for a File or Files," Internet Citation, Dec. 11, 2001, XP007901398, Retrieved from the Internet at: http://www.cse.msu.edu/cgi-bin/man2html?setfacl?1?/usr/man, retrieved on Dec. 4, 2006, 4 pages.
Sun Microsystems, Inc., Part No. 817-6064-01 entitled, "System Administration Guide: Solaris Containers, Resource Management, and Zones" (246 pgs) dated Feb. 2004.

* cited by examiner

MECHANISM FOR ENABLING A NETWORK ADDRESS TO BE SHARED BY MULTIPLE LABELED CONTAINERS

BACKGROUND

In the operating system Solaris 10 manufactured by Sun Microsystems, Inc. of Santa Clara, Calif., it is possible to divide an operating system environment into multiple partitions. So divided, the general operating system (OS) environment is referred to as the global zone, and the partitions within the global zone are referred to as the non-global zones. Each zone provides a separate virtual operating environment. One of the purposes served by the zones (particularly the non-global zones) is to provide isolation. With the zones constructs, it is possible to isolate certain entities within certain zones. By isolating an entity within a zone, it is possible to prevent that entity from accessing or affecting other entities in other zones. It is also possible to prevent other entities in other zones from accessing or affecting that entity. In many implementations, such isolation is quite desirable. For example, if it is desirable to host applications and data having different security levels on the same computer, it may be desirable to use zones to isolate the applications and data so that sensitive information does not leak from one set of applications and data to another.

One of the types of entities that can be isolated within a zone is a logical network interface. By isolating a logical network interface within a zone, it is possible to restrict use of that logical network interface to just the entities within that zone. Put another way, only entities within that zone can bind to the logical network interface and use it to effect network communication. Currently, each zone may have zero or more logical network interfaces isolated therein.

Each logical network interface is assigned a unique network address. This network address may, for example, be an Internet Protocol (IP) address. This IP address enables packets to be directed to the zone in which the logical network interface is isolated. Given that each zone may have zero or more logical network interfaces isolated therein, and that each logical network interface requires a unique IP address, if there are many zones, then there will be many unique IP addresses that are needed. This can lead to problems. As is well known, a network administrator has only a limited number of unique IP addresses at his/her disposal. That being the case, the limit on the number of IP addresses may impose a limit on the number of logical network interfaces that can be isolated within zones. This in turn can limit the number of zones that can be implemented. As a result, the limit on the number of unique IP addresses can limit the scalability of the zones concept.

SUMMARY

To overcome the shortcoming discussed above, one embodiment of the present invention provides a mechanism for enabling a network address to be shared by multiple zones (also referred to herein as containers). By allowing multiple containers to share a network address, the limit on network addresses does not limit the number of containers that can be implemented. Despite the fact that the network address is shared by multiple containers, the uniqueness and isolation of each container is still maintained. In one embodiment, this is achieved by associating a unique label with each container. With this unique label, it is possible to forward a packet destined for the shared network address to a specific container despite the fact that multiple containers share the same network address. Thus, with this embodiment of the present invention, it is possible to achieve container isolation and uniqueness without limiting container scalability.

DETAILED DESCRIPTION OF EMBODIMENT(S)

System Overview

Figure 1:
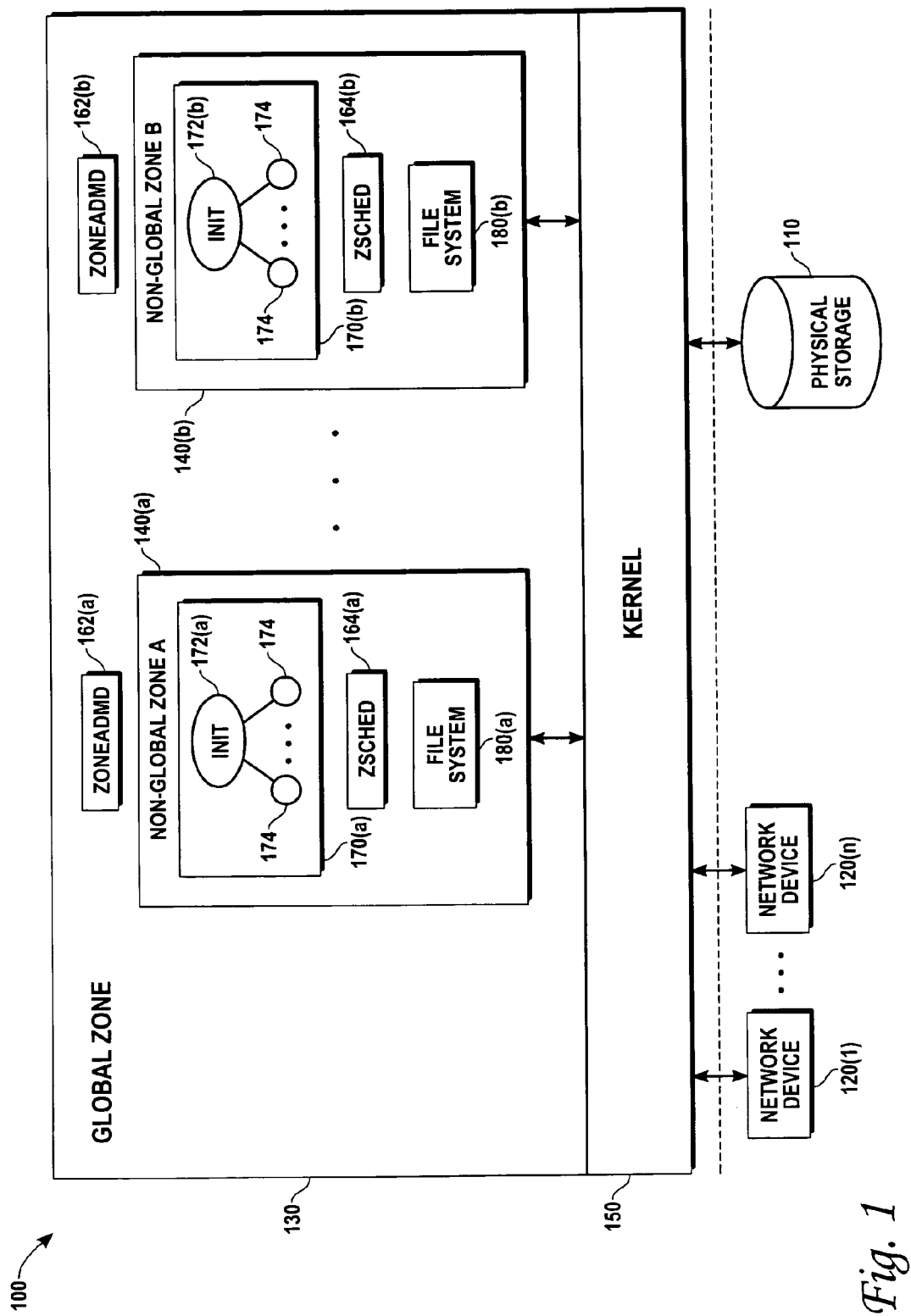
FIG. 1 shows a functional block diagram of a system in which one embodiment of the present invention may be implemented.

With reference to FIG. 1, there is shown a functional block diagram of a system in which one embodiment of the present invention may be implemented. In the system of FIG. 1, an operating system (OS) environment 100 is derived by executing an OS in a general-purpose computer system, such as computer system 500 illustrated in FIG. 5. For illustrative purposes, it will be assumed that the OS is Solaris manufactured by Sun Microsystems, Inc. of Santa Clara, Calif. However, it should be noted that the concepts taught herein may be applied to any OS, including but not limited to Unix, Linux, Windows, MacOS, etc.

As shown in FIG. 1, OS environment 100 may comprise one or more zones (also referred to herein as operating system partitions or containers), including a global zone 130 and zero or more non-global zones 140. The global zone 130 is the general OS environment that is created when the OS is booted and executed, and serves as the default zone in which processes may be executed if no non-global zones 140 are established. In the global zone 130, administrators and/or processes having the proper rights and privileges can perform generally any task and access any device/resource that is available on the computer system on which the OS is run. Thus, in the global zone 130, an administrator can administer the entire computer system. In one embodiment, it is in the global zone 130 that an administrator executes processes to configure and to manage the non-global zones 140.

The non-global zones 140 represent separate and distinct partitions of the OS environment 100. Each non-global zone 140 provides a separate virtual operating environment. One of the purposes of the non-global zones 140 is to provide isolation. In one embodiment, a non-global zone 140 can be used to isolate a number of entities, including but not limited to processes 170, one or more file systems 180, and zero or more logical network interfaces (not shown in FIG. 1). Because of this isolation, processes 170 executing in one non-global zone 140 cannot access or affect processes in any other zone. Similarly, processes 170 in a non-global zone 140 generally cannot access or affect the file system 180 of another zone. As a result, the processes 170 in a non-global zone 140 are limited to accessing and affecting the processes and entities in that zone. Isolated in this manner, each non-global zone 140 behaves like a virtual standalone computer.

Having non-global zones 140 that are isolated from each other may be desirable in many implementations. For example, if a single computer system running a single instance of an OS is to be used to host applications and file systems having different security levels, it may be desirable to isolate the data and processes so that sensitive information does not leak from one set of data and processes to another. Partitioning an OS environment 100 into non-global zones 140 and hosting the different applications and file systems in separate non-global zones 140 is one possible way of achieving this isolation.

In one embodiment, each non-global zone 140 may be administered separately. More specifically, it is possible to assign a zone administrator to a particular non-global zone 140 and grant that zone administrator rights and privileges to manage various aspects of that non-global zone 140. With such rights and privileges, the zone administrator can perform any number of administrative tasks that affect the processes and other entities within that non-global zone 140. However, the zone administrator cannot change or affect anything in any other non-global zone 140 or the global zone 130. In one embodiment, to prevent a non-global zone 140 from affecting other zones, the entities in a non-global zone 140 are generally not allowed to access or control any of the physical devices of the computer system.

In contrast to a non-global zone administrator, a global zone administrator with proper rights and privileges may administer all aspects of the OS environment 100 and the computer system as a whole. Thus, a global zone administrator may, for example, access and control physical devices, allocate and control system resources, establish operational parameters, etc. A global zone administrator may also access and control processes and entities within a non-global zone 140.

In one embodiment, enforcement of the zone boundaries is carried out by the kernel 150 of the OS. More specifically, it is the kernel 150 that ensures that processes 170 in one non-global zone 140 are not able to access or affect the processes 170 or file systems 180 of another zone (non-global or global). In addition to enforcing the zone boundaries, the kernel 150, in one embodiment, also enables a network address to be shared by multiple zones. The operation of the kernel 150 will be discussed in greater detail in a later section.

Labels

In one embodiment, each zone has a unique label associated therewith. This label may be specified by a global zone administrator at the time that the administrator configures a zone. As will be discussed in greater detail in a later section, this label is used by the kernel 150 to differentiate one zone from another when forwarding a network packet direction to a network address that is shared by multiple zones. For purposes of the present invention, any type of label may be used. So long as the label enables each zone to be uniquely identified, that is sufficient.

In an implementation in which zones are used to isolate processes and data with different sensitivity levels, each label may take the form of a sensitivity label. A sensitivity label comprises two portions: (1) a sensitivity level portion; and (2) a category portion. The sensitivity level portion specifies a sensitivity level for the zone. This sensitivity level is one of the levels in a sensitivity hierarchy, and specifies where in that hierarchy the zone belongs. For example, if the sensitivity hierarchy includes the levels of "top secret", "secret", "need-to-know", and "public", where "top secret" is the highest, then if a zone has a sensitivity level of "secret", it is known that that zone is higher than "need-to-know" and "public" but lower than "top secret". The sensitivity level portion of a sensitivity label may be common among a plurality of zones. Thus, for example, more than one zone may have a sensitivity level of "secret".

The category portion of the sensitivity label may be used to specify some particular aspect of a zone. For example, the category portion may specify a country (e.g. Iraq, Egypt, etc.) or some particular matter (e.g. Iran Contra) to which the information in the zone pertains. Like the sensitivity level portion, the category portion of a sensitivity label may be common among a plurality of zones. Thus, for example, more than one zone may have a category of "Iraq".

While neither the sensitivity level portion nor the category portion in and of itself contains unique information, together, they form a unique sensitivity label for each zone. Thus, for example, one non-global zone may have a sensitivity label of "top secret Iraq", while another may have a sensitivity label of "need-to-know Iraq", while another may have a sensitivity label of "need-to-know Egypt". In one embodiment, no two zones within the same host machine have the same sensitivity label. In the above discussion, the sensitivity levels and categories are expressed in terms of words to best facilitate understanding; however, it should be noted that these portions may be expressed in any form (e.g. numbers, combination of numbers and text, etc.) that serve the same purposes.

Non-Global Zone States

In one embodiment, a non-global zone 140 may take on one of four states: (1) Configured; (2) Installed; (3) Ready; and (4) Running. When a non-global zone 140 is in the Configured state, it means that an administrator in the global zone 130 has invoked an operating system utility (in one embodiment, zonecfg(1m)) to specify all of the configuration parameters of a non-global zone 140, and has saved that configuration in persistent physical storage 110. In configuring a non-global zone 140, an administrator may specify a number of different parameters. These parameters may include, but are not limited to, a zone name, a zone path to the root directory of the zone's file system 180, a sensitivity label, specification of zero or more mount points and entities to be mounted when the zone is readied, specification of devices to be configured when the zone is created, etc.

Once a zone is in the Configured state, a global administrator may invoke another operating system utility (in one embodiment, zoneadm(1m)) to put the zone into the Installed state. When invoked, the operating system utility interacts with the kernel 150 to install all of the necessary files and directories into the zone's root directory, or a subdirectory thereof.

To put an Installed zone into the Ready state, a global administrator invokes an operating system utility (in one embodiment, zoneadm(1m) again), which causes a ZoneADMD process 162 to be started (there is a ZoneADMD process associated with each non-global zone). In one embodiment, ZoneADMD 162 runs within the global zone 130 and is responsible for managing its associated non-global zone 140. After ZoneADMD 162 is started, it interacts with the kernel 150 to establish the non-global zone 140. In establishing a non-global zone 140, a number of operations are performed. These operations include creating the non-global zone 140 (in one embodiment, this involves assigning a zone ID to the non-global zone 140, associating a sensitivity label with the zone (this sensitivity label was specified by the global zone administrator when the non-global zone was configured), creating a zone data structure which will be used by the kernel 150 to enforce and manage zone boundaries and information access, establishing the path to the root directory of the zone as the root of the zone's file system 180, etc.). The establishment operations may also include starting a zsched process 164 (zsched is a kernel process; however, it runs within the non-global zone 140, and is used to track kernel resources associated with the non-global zone 140), configuring devices, etc. These and other operations put the non-global zone 140 into the Ready state to prepare it for normal operation.

Putting a non-global zone 140 into the Ready state gives rise to a virtual platform on which one or more processes may be executed. This virtual platform provides the infrastructure necessary for enabling one or more processes to be executed within the non-global zone 140 in isolation from processes in other non-global zones 140. The virtual platform also makes it possible to isolate other entities such as file system 180 within the non-global zone 140, so that the zone behaves like a virtual standalone computer.

After a non-global zone 140 is in the Ready state, it can be transitioned into the Running state by executing one or more user processes in the zone. In one embodiment, this is done by having ZoneADMD 162 start an init process 172 in its associated zone. Once started, the init process 172 looks in the file system 180 of the non-global zone 140 to determine what applications to run. The init process 172 then executes those applications to give rise to one or more other processes 174. In this manner, an application environment is initiated on the virtual platform of the non-global zone 140. In this application environment, all processes 170 are confined to the non-global zone 140; thus, they cannot access or affect processes or file systems in other zones. The application environment exists so long as one or more user processes are executing within the non-global zone 140.

After a non-global zone 140 is in the Running state, its associated ZoneADMD 162 can be used to manage it. ZoneADMD 162 can be used to initiate and control a number of zone administrative tasks. These tasks may include, for example, halting and rebooting the non-global zone 140. When a non-global zone 140 is halted, it is brought from the Running state down to the Installed state. In effect, both the application environment and the virtual platform are terminated. When a non-global zone 140 is rebooted, it is brought from the Running state down to the Installed state, and then transitioned from the Installed state through the Ready state to the Running state. In effect, both the application environment and the virtual platform are terminated and restarted. These and many other tasks may be initiated and controlled by ZoneADMD 162 to manage a non-global zone 140 on an ongoing basis during regular operation.

Network Address Sharing

As noted previously, one embodiment of the present invention enables a network address to be shared by multiple zones (hereinafter referred to as containers). To show how this may be done, reference will now be made to the example depicted in FIG. 2. In the following example, it will be assumed that the shared network address is an IP address and that the routing protocol is TCP/IP. However, it should be noted that the concepts taught herein are not so limited but rather may be applied to any type of network address and any type of routing protocol.

In one embodiment, to enable network address sharing, the kernel 150 creates a logical network interface 200 in the global zone 130. This logical network interface 200 may be created by the kernel 150 upon boot-up, or it may be created at a later time. Once created, the logical network interface 200 is assigned an IP address (assume IP address X for the sake of example). The IP address assigned to the logical network interface 200 may be determined by the kernel 150 based upon a set of configuration information provided by a global administrator. After the IP address is assigned, the kernel 150 performs all of the necessary "plumbing" operations to render the logical network interface 200 operational, and maps it to one of the physical network devices 120 (which may, for example, be network interface cards or NIC's) in the system. Once that is done, the logical network interface 200 may be used by processes to send network packets and to receive network packets destined for the IP address X. In the current example, logical network interface 200 may be used and shared by all of the processes in the system.

Suppose now that a global administrator enters a command (e.g. zoneadm(1m)) to establish the container 1 140(1) within the global zone 130. As a result of executing this command, ZoneADMD 162(1) is started, and interacts with the kernel 150 to establish the container 1 140(1). As part of this establishment process, the kernel 150 creates the container 1 140(1). As part of the creation process, the kernel 150 associates a label (in the following example, it will be assumed that all labels are sensitivity labels) with container 1 140(1). For the sake of example, it will be assumed that sensitivity label 1 is associated with container 1 140(1). Other establishment operations, such as those set forth previously, may also be performed to fully establish container 1 140(1). After container 1 140(1) is established, one or more processes, such as process 1 210, may be executed within the container 1 140(1). In one embodiment, when process 1 210 is executed, the kernel 150 associates process 1 210 with container 1 140(1). That way, the kernel 150 can ensure that process 1 210 is contained within the container 1 140(1).

Suppose now that process 1 210 is a process that wishes to communicate on a network. Thus, when it starts, process 1 210 sends a request to the kernel 150 for a list of available logical network interfaces. In the current example, logical network interface 200 is the only one available; thus, the kernel 150 returns information pertaining to logical network interface 200 to process 1 210. Upon receiving this information, process 1 210 sends a request to the kernel 150 to bind to logical network interface 200.

In one embodiment, in response to this bind request, the kernel 150 determines, based upon previous association, that process 1 210 is executing within container 1 140(1). The kernel 150 further determines, based upon previous association, that sensitivity label 1 is associated with container 1 140(1). Based upon these determinations, the kernel 150 knows that process 1 210 should be associated with sensitivity label 1. Given this information, the kernel 150 binds process 1 210 to logical network interface 200. In one embodiment, this bind operation involves storing, into a binding data structure 230 (which, for example, may be a table), some binding information indicating an association between process 1 210, the IP address X, sensitivity label 1, and perhaps some other information (e.g. a particular port number). This binding information may indicate, for example, that if a packet is received having destination IP address X, sensitivity label 1, and a particular port number, then that packet should be forwarded to process 1 210. This binding information will be used by the kernel 150 later on to forward packets to process 1 210. In this manner, process 1 210 in container 1 140(1) is bound to logical network interface 200. Process 1 210 may thereafter use logical network interface 200, and hence, IP address X, to effect network communication.

Suppose now that a global administrator enters a command (e.g. zoneadm(1m)) to establish the container 2 140(2) within the global zone 130. As a result of executing this command, ZoneADMD 162(2) is started, and interacts with the kernel 150 to establish the container 2 140(2). As part of this establishment process, the kernel 150 creates the container 2 140 (2). As part of the creation process, the kernel 150 associates a sensitivity label with container 2 140(2). For the sake of example, it will be assumed that sensitivity label 2 is associated with container 2 140(2). Other establishment operations may also be performed to fully establish container 2 140(2). After container 2 140(2) is established, one or more processes, such as process 2 220, may be executed within the container 2 140(2). In one embodiment, when process 2 220 is executed, the kernel 150 associates process 2 220 with container 2 140(2). That way, the kernel 150 can ensure that process 2 220 is contained within the container 2 140(2).

Suppose now that process 2 220 is a process that wishes to communicate on a network. Thus, when it starts, process 2 220 sends a request to the kernel 150 for a list of available logical network interfaces. In the current example, logical network interface 200 is the only one available; thus, the kernel 150 returns information pertaining to logical network interface 200 to process 2 220. Upon receiving this information, process 2 220 sends a request to the kernel 150 to bind to logical network interface 200.

In one embodiment, in response to this bind request, the kernel 150 determines, based upon previous association, that process 2 220 is executing within container 2 140(2). The kernel 150 further determines, based upon previous association, that sensitivity label 2 is associated with container 2 140(2). Based upon these determinations, the kernel 150 knows that process 2 220 should be associated with sensitivity label 2. Given this information, the kernel 150 binds process 2 220 to logical network interface 200. In one embodiment, this bind operation involves storing, into the binding data structure 230, some binding information indicating an association between process 2 220, the IP address X, sensitivity label 2, and perhaps some other information (e.g. a certain port number). This information may indicate, for example, that if a packet is received having destination IP address X, sensitivity label 2, and a certain port number, then that packet should be forwarded to process 2 220. This binding information will be used by the kernel 150 later on to forward packets to process 2 220. In this manner, process 2 220 in container 2 140(2) is bound to logical network interface 200. Process 2 220 may thereafter use logical network interface 200, and hence, IP address X, to effect network communication. Notice that both process 1 210 and process 2 220 may now use IP address X to effect network communication. Since these processes are in two distinct containers 140(1), 140(2), the IP address X is effectively shared by the two containers. In the example shown in FIG. 2, only two containers and two processes are shown. It should be noted, though, that for purposes of the present invention, any number of processes and any number of containers may share the logical network interface 200 and hence, the IP address X.

Figure 2:
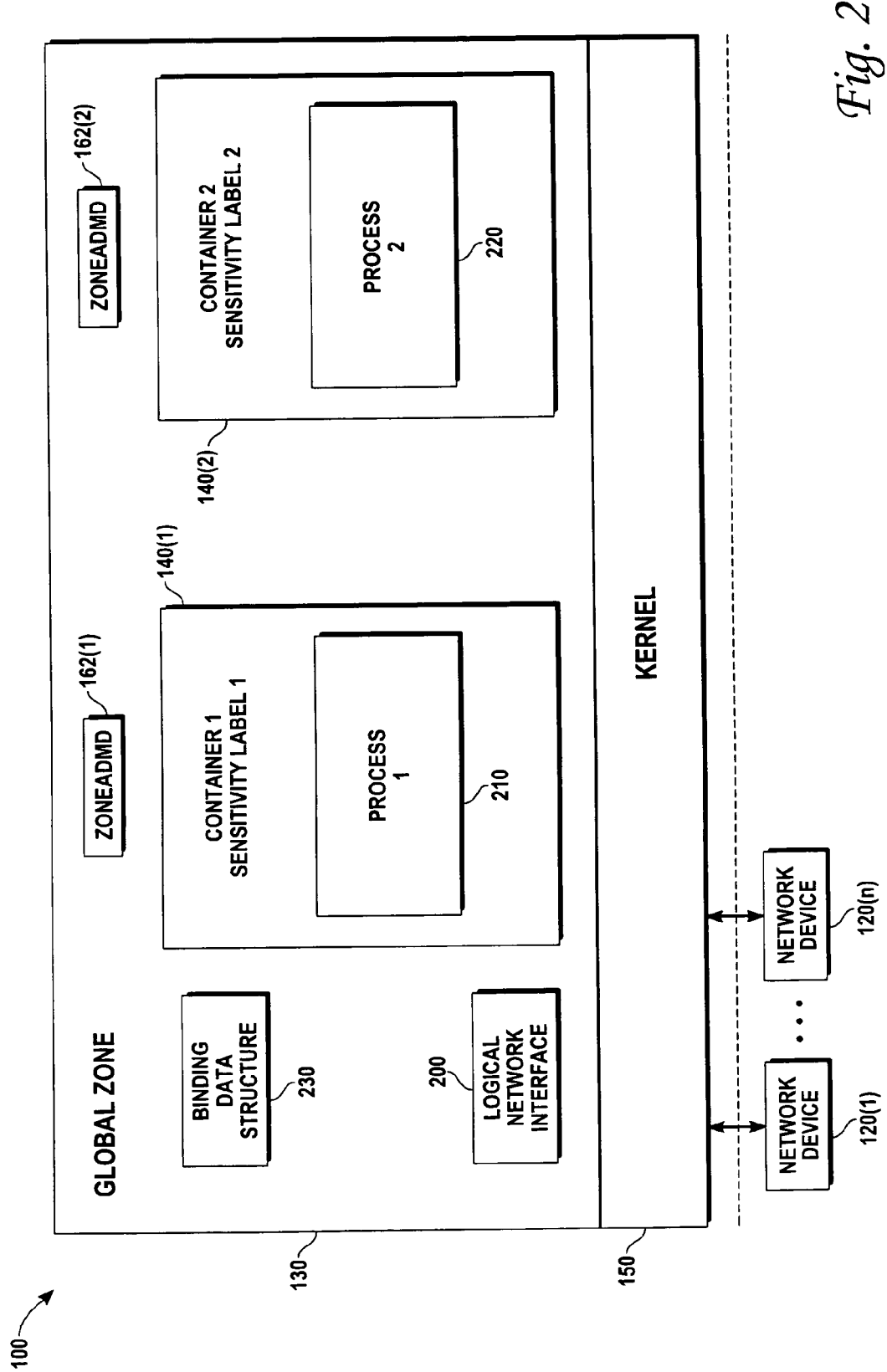
FIG. 2 is a functional block diagram of a system in which a single logical network interface (with its associated network address) is shared by all of the containers in the system, in accordance with one embodiment of the present invention.

Given the arrangement shown in FIG. 2, the forwarding of a packet in accordance with one embodiment of the present invention will now be described. Suppose that a packet having IP address X as the destination address is received by the physical network device 120 to which the logical network interface 200 is mapped. When this packet is received, the kernel 150, which in one embodiment performs the networking functions of the system, determines to which process that packet should be delivered. Given just the destination IP address X (which is shared by multiple containers), the kernel 150 cannot determine to which specific process and which specific container the packet should be delivered. Thus, in one embodiment, the kernel 150 delves deeper to determine a packet label for the packet. In one embodiment, to do so, the kernel 150 inspects the packet to see if a label is specified in the packet. If so, then the specified label is extracted from the packet and is used as the packet label. On the other hand, if no label is specified in the packet, then the kernel 150 extracts a source address from the packet. The kernel 150 then determines whether that source address has a default label associated therewith. This may be done, for example, by checking a set of configuration information provided by a global administrator to see if any default label has been associated with this source address. If not, then the packet is dropped. If yes, then the default label is used as the packet label.

After the packet label is determined, the kernel 150 uses the destination IP address of the packet, the packet label, and perhaps some other information from the packet (e.g. port number) to determine which process to forward the packet to. In one embodiment, the kernel 150 compares the destination IP address, the packet label, and the other information with the information previously stored in the binding data structure 230. If, for example, the destination IP address, packet label, and other information match the IP address X, sensitivity label 1, and the other information associated with process 1 210, then the kernel 150 forwards the packet to process 1 210 in container 1 140(1). If the destination IP address, packet label, and other information match the IP address X, sensitivity label 2, and other information associated with process 2 220, then the kernel 150 forwards the packet to process 2 220 in container 2 140(2). In one embodiment, the kernel 150 goes through the sets of information in the binding data structure 230, and determines which process (or processes) in which container should receive the packet. The kernel 150 then forwards the packet to each of those processes in that container.

As shown in the example above, the kernel 150 uses the packet label and the sensitivity labels of the containers to determine which process in which container to forward the packet to. Effectively, the sensitivity labels of the containers allow the kernel 150 to differentiate one container from another. With these sensitivity labels, the kernel 150 is able to forward a packet to a particular process within a particular container despite the fact that the destination IP address specified in the packet is shared by multiple containers. Thus, through the use of container labels, the kernel 150 is able to share an IP address among multiple containers.

Alternative Embodiments

Figure 3:
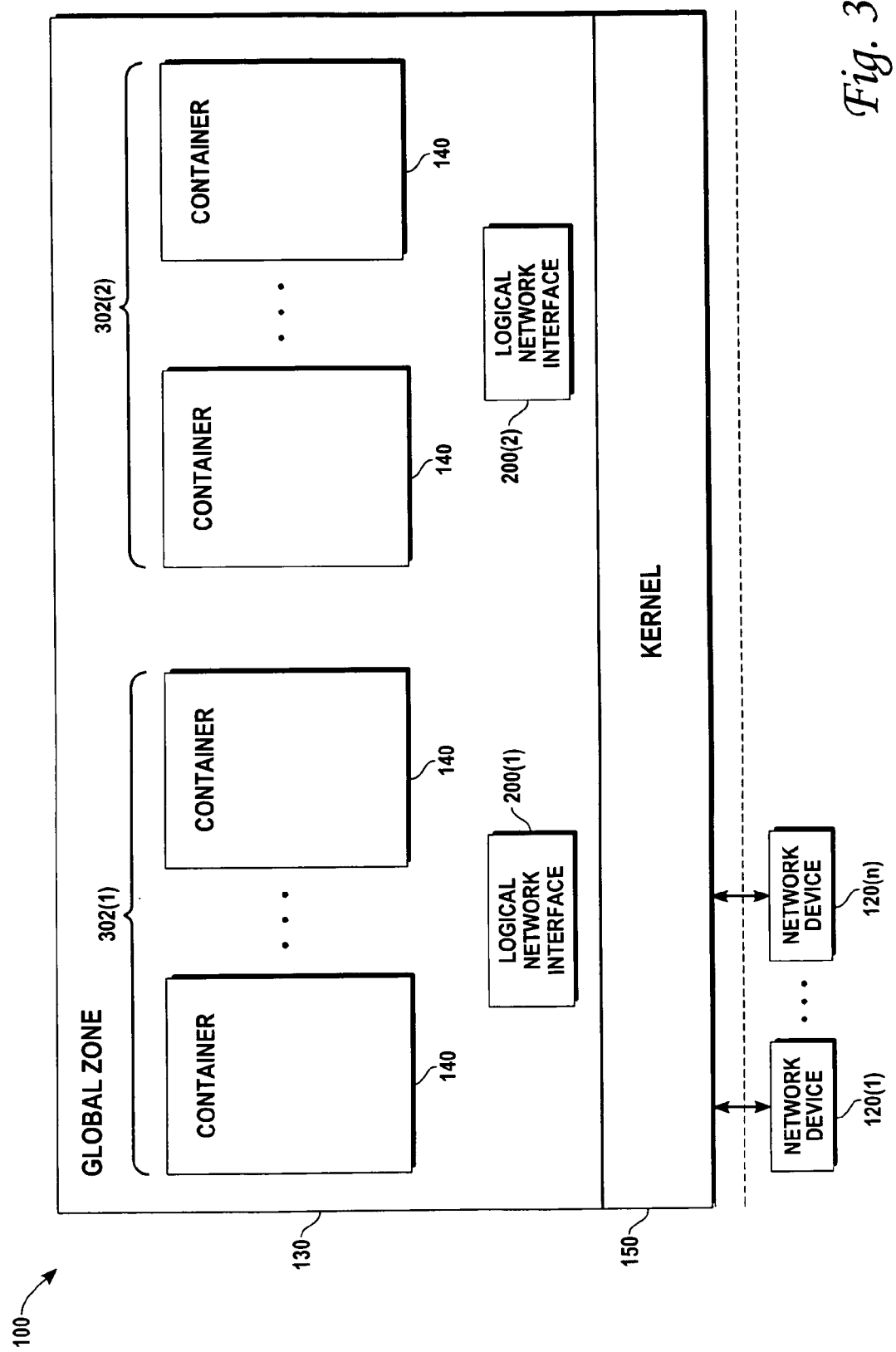
FIG. 3 is a functional block diagram of a system in which multiple logical network interfaces (with their associated network addresses) are shared by subsets of containers in the system, in accordance with one embodiment of the present invention.

In the above example, a single logical network interface 200 is created in the global zone 130, and that single interface (and its associated IP address) is shared by all of the processes in all of the containers in the system. As an alternative, multiple logical network interfaces may be created in the global zone 130, and each of those interfaces (and its associated IP address) may be shared by a subset of the containers in the system. This is shown in FIG. 3, wherein the kernel 150 has created multiple logical network interfaces 200(1) and 200 (2), and wherein logical network interface 200(1) (and its associated IP address) is shared by a first set 302(1) of containers 140, and logical network interface 200(2) (and its associated IP address) is shared by a second set 302(2) of containers 140. In one embodiment, to enable this arrangement, a global administrator provides a set of configuration information that specifies which sensitivity labels should share which IP address. For example, the configuration information may specify that sensitivity labels 5-10 should share IP address Y while sensitivity labels 11-15 should share IP address Z. Given this information, the kernel 150 will know which process in which container should be bound to which logical network interface (and its associated IP address). For example, given this configuration information, the kernel 150 will know that, when it receives a request for available logical network interfaces from a process in one of the containers (which will have an associated sensitivity label) in container set 302(1), it should return information pertaining to logical network interface 200(1) (which will have an associated IP address). Doing so will cause processes in the containers of container set 302(1) to be bound only to logical network interface 200(1). The same would be done for container set 302(2) and logical network interface 202(2). In this manner, multiple logical network interfaces may be shared by subsets of containers.

Figure 4:
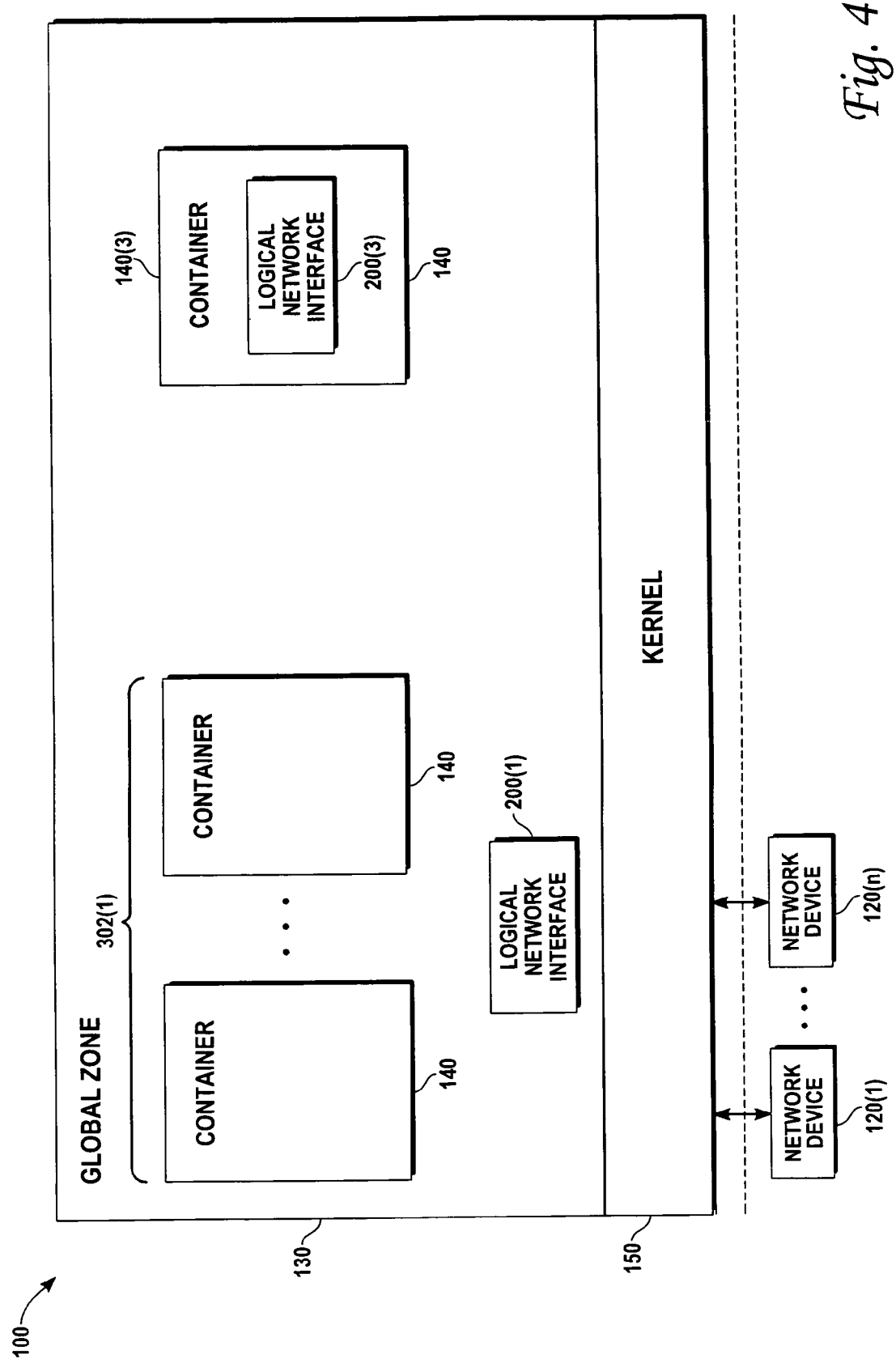
FIG. 4 is a functional block diagram of a system in which a logical network interface (with its associated network address) is shared by a subset of containers, and another logical network interface (with its associated network address) is contained within a particular container, in accordance with one embodiment of the present invention.

As a further alternative, it is possible, as depicted in FIG. 4, for a logical network interface 200(1) (and its associated IP address) to be shared by a subset 302(1) of containers, while another logical network interface 200(3) (and its associate IP address) is contained within a particular container 140(3). With this arrangement, the processes in the containers of container set 302(1) would share logical network interface 200(1) (and its associated IP address), while only the processes in container 140(3) would be able to use logical network interface 200(3) and its associated IP address.

The above alternative embodiments are just a few of the many possibilities. All possible alternative embodiments are within the scope of the present invention.

Hardware Overview

Figure 5:
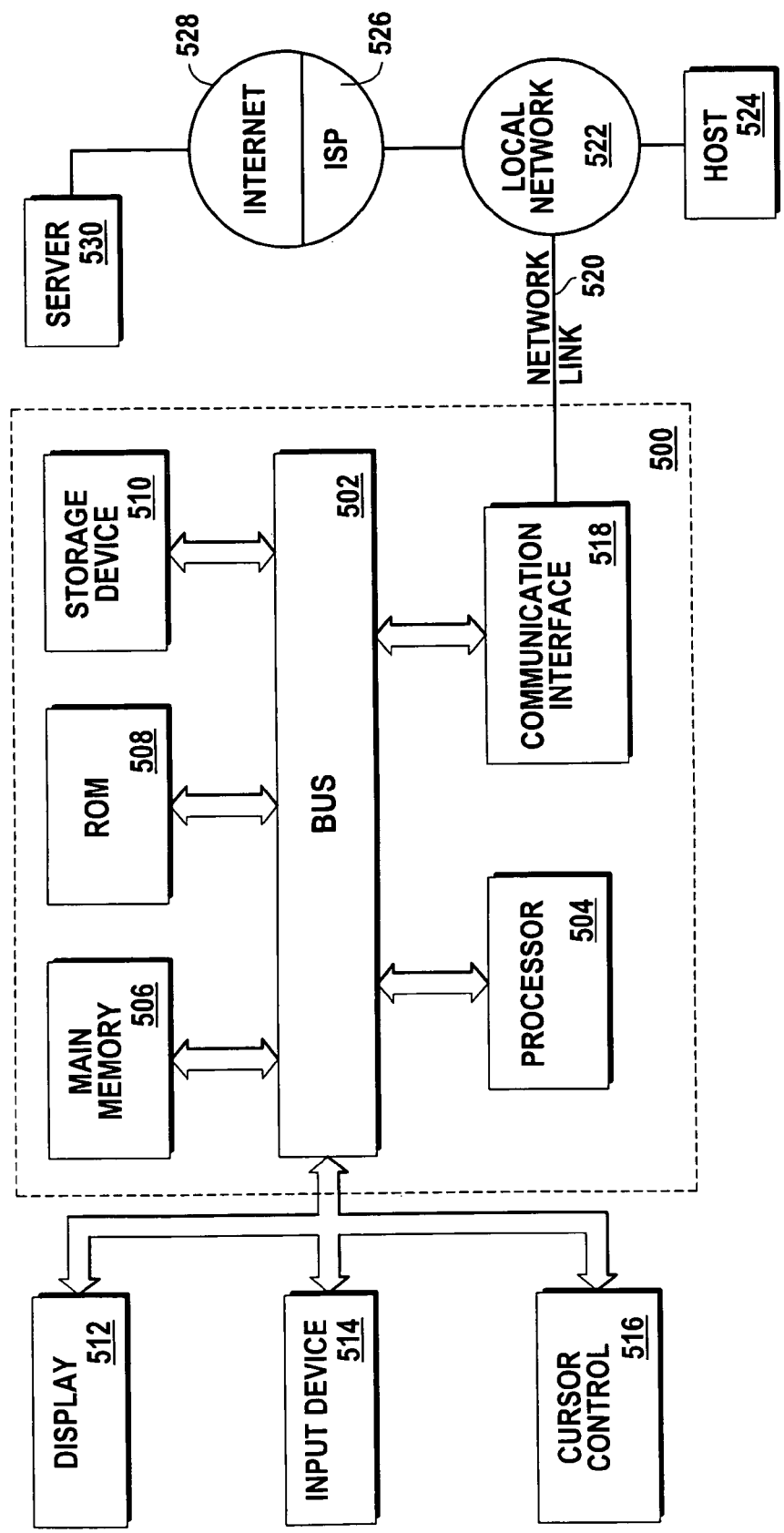
FIG. 5 is a block diagram of a general purpose computer system in which one embodiment of the present invention may be implemented.

In one embodiment, the ZoneADMD's 162, processes 210, 220, and the OS, which includes kernel 150, may take the form of sets of instructions that are executed by one or more processors. If they take the form of sets of instructions, FIG. 5 shows a block diagram of a computer system 500 upon which these sets of instructions may be executed. Computer system 500 includes a bus 502 for facilitating information exchange, and one or more processors 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions by processor 504. Computer system 500 may further include a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512 for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In computer system 500, bus 502 may be any mechanism and/or medium that enables information, signals, data, etc., to be exchanged between the various components. For example, bus 502 may be a set of conductors that carries electrical signals. Bus 502 may also be a wireless medium (e.g. air) that carries wireless signals between one or more of the components. Bus 502 may further be a network connection that connects one or more of the components. Any mechanism and/or medium that enables information, signals, data, etc., to be exchanged between the various components may be used as bus 502.

Bus 502 may also be a combination of these mechanisms/media. For example, processor 504 may communicate with storage device 510 wirelessly. In such a case, the bus 502, from the standpoint of processor 504 and storage device 510, would be a wireless medium, such as air. Further, processor 504 may communicate with ROM 508 capacitively. Further, processor 504 may communicate with main memory 506 via a network connection. In this case, the bus 502 would be the network connection. Further, processor 504 may communicate with display 512 via a set of conductors. In this instance, the bus 502 would be the set of conductors. Thus, depending upon how the various components communicate with each other, bus 502 may take on different forms. Bus 502, as shown in FIG. 5, functionally represents all of the mechanisms and/or media that enable information, signals, data, etc., to be exchanged between the various components.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine implemented method, comprising:
   creating a logical network interface within an operating system (OS) environment mapped to a physical network device;
   assigning a particular network address to the logical network interface within the OS environment;
   creating a first OS partition within the OS environment;
   associating, with the first OS partition, a first label comprising a first category describing information in the first OS partition;
   creating a second OS partition within the OS environment;
   associating, with the second OS partition, a second label comprising a second category describing information in the second OS partition;
   binding the logical network interface to a first process executing within the first OS partition using the first label;
   binding the logical network interface to a second process executing within the second OS partition using the second label;
   receiving, by the logical network interface, a first information packet destined for the particular network address and a second information packet destined for the particular network address;
   determining, using the first information packet, a first packet label;
   comparing the first packet label with the first label to generate a first match;
   forwarding, based on the first match, the first information packet to the first process in the first OS partition;
   determining, using the second information packet, a second packet label;
   comparing the second packet label with the second label to generate a second match;
   forwarding, based on the second match, the second information packet to the second process in the second OS partition.

2. The method of claim 1, wherein the first information packet includes a specified label, and wherein determining the first packet label using the first information packet comprises:
   extracting the specified label from the first information packet; and
   using the specified label as the first packet label.

3. The method of claim 1, wherein determining the first packet label using the first information packet comprises:
   extracting a source network address from the first information packet;
   determining that a default label is associated with the source network address; and
   using the default label as the first packet label.

4. The method of claim 1, wherein binding the logical network interface to the first process using the first label comprises:
   receiving a request from the first process to bind the first process to the logical network interface;
   determining that the first process is executing within the first OS partition;
   determining that the first OS partition has the first label associated therewith; and
   storing, into a data structure, a set of information indicating that at least the particular network address and the first label are associated with the first process.

5. The method of claim 4, wherein binding the logical network interface to the second process using the second label comprises:
- receiving a request from the second process to bind the second process to the logical network interface;
- determining that the second process is executing within the second OS partition;
- determining that the second OS partition has the second label associated therewith; and
- storing, into the data structure, a set of information indicating that at least the particular network address and the second label are associated with the second process.

6. The method of claim 1, further comprising:
- isolating the first process within the first OS partition such that the first process is prevented from accessing or affecting processes in other OS partitions; and
- isolating the second process within the second OS partition such that the second process is prevented from accessing or affecting processes in other OS partitions.

7. A non-transitory machine readable storage medium, comprising:
- instructions for causing one or more processors to create a logical network interface within an operating system (OS) environment mapped to a physical network device;
- instructions for causing one or more processors to assign a particular network address to the logical network interface within the OS environment;
- instructions for causing one or more processors to create a first OS partition within the OS environment;
- instructions for causing one or more processors to associate, with the first OS partition, a first label comprising a first category describing information in the first OS partition;
- instructions for causing one or more processors to create a second OS partition within the OS environment;
- instructions for causing one or more processors to associate, a second label with the second OS partition, a second label comprising a second category describing information in the second OS partition;
- instructions for causing one or more processors to bind the logical network interface to a first process executing within the first OS partition using the first label;
- instructions for causing one or more processors to bind the logical network interface to a second process executing within the second OS partition using the second label;
- instructions for causing one or more processors to receive, by the logical network interface, a first information packet destined for the particular network address and a second information packet destined for the particular network address;
- instructions for causing one or more processors to determine, using the first information packet, a first packet label;
- instructions for causing one or more processors to compare the first packet label with the first label to generate a first match;
- instructions for causing one or more processors to forward, based on the first match, the first information packet to the first process in the first OS partition;
- instructions for causing one or more processors to determine, using the second information packet, a second packet label;
- instructions for causing one or more processors to compare the second packet label with the second label to generate a second match;
- instructions for causing one or more processors to forward, based on the second match, the second information packet to the second process in the second OS partition.

8. The non-transitory machine readable storage medium of claim 7, wherein the first information packet includes a specified label, and wherein the instructions for causing one or more processors to determine the first packet label using the first information packet comprises:
- instructions for causing one or more processors to extract the specified label from the first information packet; and
- instructions for causing one or more processors to use the specified label as the first packet label.

9. The non-transitory machine readable storage medium of claim 7, wherein the instructions for causing one or more processors to determine the first packet label using the first information packet comprises:
- instructions for causing one or more processors to extract a source network address from the first information packet;
- instructions for causing one or more processors to determine that a default label is associated with the source network address; and
- instructions for causing one or more processors to use the default label as the first packet label.

10. The non-transitory machine readable storage medium of claim 7, wherein the instructions for causing one or more processors to bind the logical network interface to the first process using the first label comprises:
- instructions for causing one or more processors to receive a request from the first process to bind the first process to the logical network interface;
- instructions for causing one or more processors to determine that the first process is executing within the first OS partition;
- instructions for causing one or more processors to determine that the first OS partition has the first label associated therewith; and
- instructions for causing one or more processors to store, into a data structure, a set of information indicating that at least the particular network address and the first label are associated with the first process.

11. The non-transitory machine readable storage medium of claim 10, wherein the instructions for causing one or more processors to bind the logical network interface to the second process using the second label comprises:
- instructions for causing one or more processors to receive a request from the second process to bind the second process to the logical network interface;
- instructions for causing one or more processors to determine that the second process is executing within the second OS partition;
- instructions for causing one or more processors to determine that the second OS partition has the second label associated therewith; and
- instructions for causing one or more processors to store, into the data structure, a set of information indicating that at least the particular network address and the second label are associated with the second process.

12. The non-transitory machine readable storage medium of claim 7, further comprising:
- instructions for causing one or more processors to isolate the first process within the first OS partition such that the first process is prevented from accessing or affecting processes in other OS partitions; and
- instructions for causing one or more processors to isolate the second process within the second OS partition such that the second process is prevented from accessing or affecting processes in other OS partitions.

* * * * *